(12) United States Patent
Vedula

(10) Patent No.: US 10,614,468 B2
(45) Date of Patent: Apr. 7, 2020

(54) EVENT-BASED SCORE PROCESSING

(71) Applicant: Oracle International Corporation, Redwood Shores, CA (US)

(72) Inventor: Venkata Naga Ravi Kiran Vedula, Belmont, CA (US)

(73) Assignee: Oracle International Corporation, Redwood Shores, CA (US)

(*) Notice: Subject to any disclaimer, the term of this patent is extended or adjusted under 35 U.S.C. 154(b) by 1589 days.

(21) Appl. No.: 14/163,791

(22) Filed: Jan. 24, 2014

(65) Prior Publication Data
US 2015/0213454 A1    Jul. 30, 2015

(51) Int. Cl.
*G06F 11/00*     (2006.01)
*G06Q 30/00*     (2012.01)

(52) U.S. Cl.
CPC .................. *G06Q 30/016* (2013.01)

(58) Field of Classification Search
CPC ..................... G06F 16/24568; G06F 16/334
See application file for complete search history.

(56) References Cited

U.S. PATENT DOCUMENTS

| | | | | | |
|---|---|---|---|---|---|
| 6,367,034 | B1* | 4/2002 | Novik | ............... | G06F 16/24568 714/39 |
| 6,496,814 | B1* | 12/2002 | Busche | ................. | G06Q 10/10 706/21 |
| 2011/0320440 | A1* | 12/2011 | McDonald | ............ | G06F 16/958 707/723 |
| 2012/0005219 | A1* | 1/2012 | Apacible | ............... | G06F 16/334 707/768 |
| 2012/0303356 | A1* | 11/2012 | Boyle | ................. | G06F 17/2785 704/9 |
| 2013/0097146 | A1* | 4/2013 | Lanphear | ............ | G06F 16/9535 707/706 |
| 2013/0132327 | A1* | 5/2013 | Pande | .................... | G06N 5/022 706/50 |
| 2013/0232240 | A1* | 9/2013 | Purusothaman | ...... | H04L 43/045 709/220 |
| 2013/0282682 | A1* | 10/2013 | Batraski | ................ | G06F 16/951 707/706 |
| 2013/0282702 | A1* | 10/2013 | Zhu | ..................... | G06F 16/3322 707/723 |
| 2013/0282709 | A1* | 10/2013 | Zhu | ..................... | G06F 16/3322 707/728 |
| 2013/0332240 | A1* | 12/2013 | Patri | ...................... | G06Q 10/06 705/7.36 |
| 2015/0169606 | A1* | 6/2015 | Zhu | ..................... | G06F 16/3325 707/706 |

* cited by examiner

*Primary Examiner* — Talia F Crawley
(74) *Attorney, Agent, or Firm* — Kraguljac Law Group, LLC

(57) ABSTRACT

A method of temporarily boosting knowledge record metrics in a knowledge management system during external event intervals may include receiving an event notification. The event notification may be associated with a time interval, and the event notification may be associated with an event. The method may also include identifying a record in a knowledge database. The record may be identified based on relevance to the event, the record may be associated with a metric, and the metric may be used to determine if the record is responsive to queries received by the knowledge management system. The method may additionally include adjusting the metric during the time interval such that the record is more likely to be responsive to user queries.

20 Claims, 9 Drawing Sheets

402

| Record ID | Score | Relevant Terms | Last Updated |
|---|---|---|---|
| 1 | 10 | A,B,C,D | 10-Mar-2013 |
| 2 | 20 | B,C,D | 15-Mar-2013 |

400

404

| Event Type ID | Record ID | Boost Score |
|---|---|---|
| E1 | 1 | 40 |
| E2 | 1 | 10 |
| E2 | 2 | 30 |
| E1 | 2 | 10 |

405

| System ID | Event Type ID | Event Definition | Recheck Interval |
|---|---|---|---|
| ERP | E1 | Billing Initiated=FALSE AND Order_due<Today + 10 | 10 |
| INV | E2 | Stock-at-hand<10 AND next-shipment-date>TODAY +5 | 10 |

406

| Event ID | Event Type ID | Start Time | End Time | Processed |
|---|---|---|---|---|
| 1 | E1 | T1 | T2 | 1 |
| 2 | E1 | T4 | T5 | 1 |
| 3 | E2 | T10 | T20 | 0 |

FIG. 4

EVENT-BASED SCORE PROCESSING

BACKGROUND

Managing large businesses may involve storing, aggregating, and analyzing large amounts of data. Many organizations use Enterprise Software Systems to manage almost every form of business data. For example, Enterprise Software Systems can provide business-oriented tools such as online shopping and online payment processing, interactive product catalogs, automated billing systems, security, enterprise content management, IT service management, customer relationship management, enterprise resource planning, business intelligence, project management, collaboration, human resource management, manufacturing, enterprise application integration, and Enterprise forms automation.

Customer relationship management (CRM) provides a framework for managing an institution's interactions with future and current customers. CRM generally involves using technology to organize, synchronize, and/or automate sales, marketing, technical support, and customer service. With special regards to customer service, an Enterprise Software System may include CRM hardware and software that handles requests made by customers, such as call center systems, or online self-help systems.

BRIEF SUMMARY

In one embodiment, a method of temporarily boosting knowledge record metrics in a knowledge management system during external event intervals may be presented. The method may include receiving an event notification. The event notification may be associated with a time interval, and the event notification may be associated with an event. The method may also include identifying a record in a knowledge database. The record may be identified based on relevance to the event, the record may be associated with a metric, and the metric may be used to determine if the record is responsive to queries received by the knowledge management system. The method may additionally include adjusting the metric during the time interval such that the record is more likely to be responsive to user queries. This method may be carried out by one or more processors.

In another embodiment, a non-transitory computer-readable medium may be presented. The computer-readable memory may comprise a sequence of instructions which, when executed by one or more processors, causes the one or more processors to temporarily boost knowledge record metrics in a knowledge management system during external event intervals. The instructions may cause the processor(s) to receive an event notification. The event notification may be associated with a time interval, and the event notification may be associated with an event. The instructions may also cause the processor(s) to identify a record in a knowledge database. The record may be identified based on relevance to the event, the record may be associated with a metric, and the metric may be used to determine if the record is responsive to queries received by the knowledge management system. The instructions may additionally cause the processor(s) to adjust the metric during the time interval such that the record is more likely to be responsive to user queries. This method may be carried out by one or more processors.

In yet another embodiment, a system may be presented. The system may include one or more processors and a memory communicatively coupled with and readable by the one or more processors. The memory may comprise a sequence of instructions which, when executed by the one or more processors, cause the one or more processors to temporarily boost knowledge record metrics in a knowledge management system during external event intervals. The instructions may cause the processor(s) to The instructions may cause the processor(s) to receive an event notification. The event notification may be associated with a time interval, and the event notification may be associated with an event. The instructions may also cause the processor(s) to identify a record in a knowledge database. The record may be identified based on relevance to the event, the record may be associated with a metric, and the metric may be used to determine if the record is responsive to queries received by the knowledge management system. The instructions may additionally cause the processor(s) to adjust the metric during the time interval such that the record is more likely to be responsive to user queries. This method may be carried out by one or more processors.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 4 illustrates a plurality of tables that may be used by an event boost manager, according to one embodiment.

DETAILED DESCRIPTION

Figure 1:
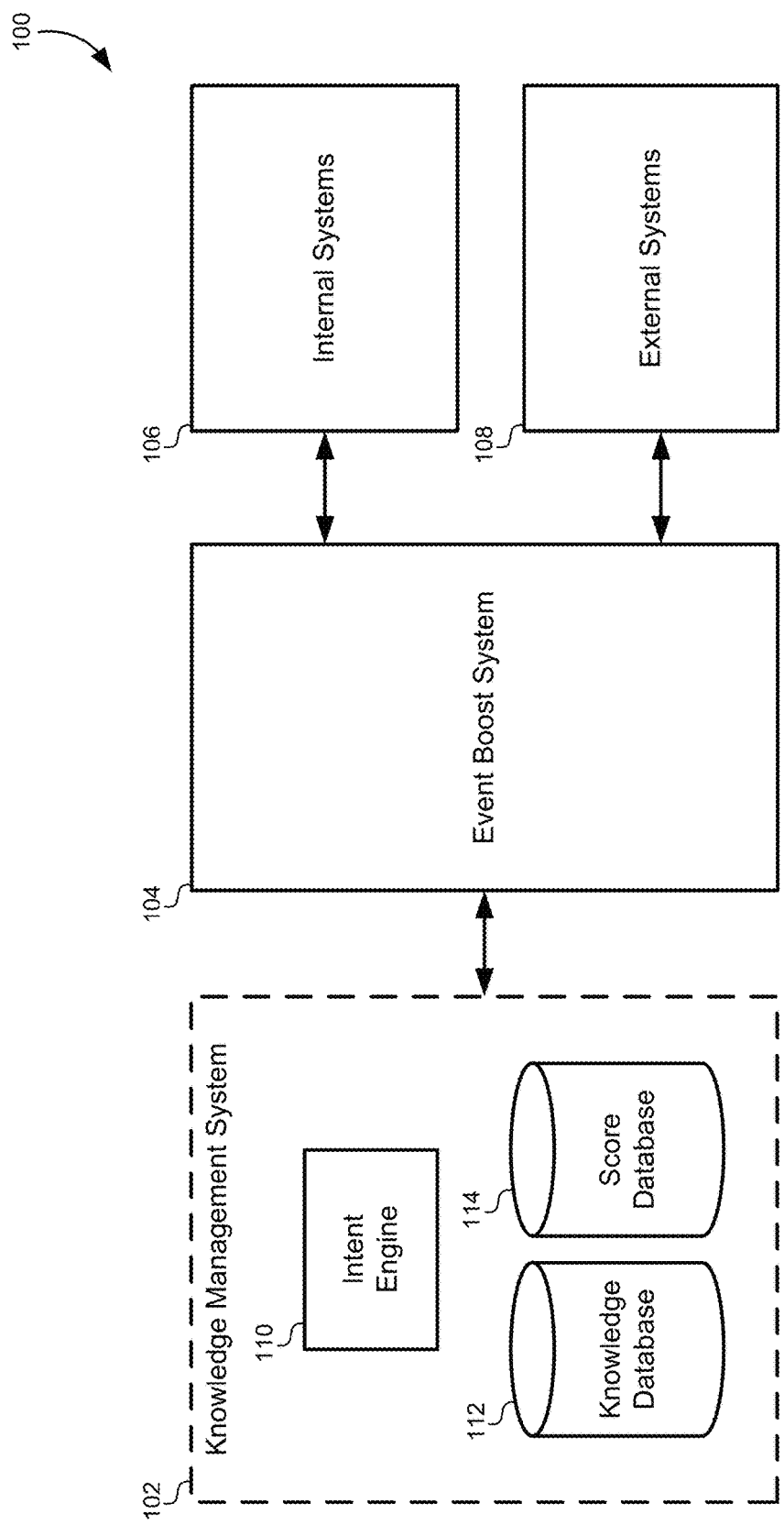
FIG. 1 illustrates a block diagram of a knowledge management system and an event boost system, according to one embodiment.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Described herein, are embodiments for temporarily boosting knowledge base scores in response to events. Businesses often run customer service applications in either hosted or on-premise modes. These customer service applications are designed to provide answers for customer concerns and to deflect customers from contacting more expensive operations, such as call centers or human agents. In addition to costing more, businesses may operate call centers remotely or outsource call centers to other countries. This can result in language and cultural barriers that often result in customer dissatisfaction, particularly when customers realize that they have reached an outsourced or remote call center.

In order to save money and increase customer satisfaction, many businesses run a variety of software applications meant to automate the customer service process. These include online FAQs, searchable knowledge bases, solution centers, and/or the like. To make the situation more complex, businesses may even outsource software solutions to independent software vendors, resulting in a one-size-fits-all approach to customer service applications that is unable to account for internal operations and distribution networks of the business. Events occurring within the internal operations and distribution networks of the business can often have a significant impact on products and services provided to customers that are not reflected in customer service application responses.

Events, anomalies, accidents, system failures, and/or the like, can affect the type of information that users will find most useful. Most of the current self-service applications provide self-service solutions that are ranked by relevancy, access, and/or usage statistics. For example, a customer of an airline may search for the airline's reservation process on a website. This search will most likely return a link to a web interface through which the customer can reserve a flight. This search result may be based on computing an intent classification for the user query and matching it to a document, website, or resource in the customer service system that is most relevant to the computed intent. Relevancy can be determined based on previous search results and customer satisfaction with those results (e.g. how often users searching for "reservation policy" selected the link for the reservation web interface from a list of results).

By using traditional relevancy statistics and intent matching to generate results for customer service queries, less frequently selected solutions will generally not be promoted to the top of a result list unless they are frequently selected over time. However, events external to the customer service system may, for a short time interval, make less popular results temporarily more relevant.

Continuing with the example of the airline, the airline may experience technical problems with one or more its aircraft, delays associated with an airport terminal, and/or weather problems that can result in flight delays. When a customer of the airline requests information about a reservation policy during such an event, it may be desirable to temporarily promote a link to the airline's cancellation policy to the top of the result list. This temporary boosting of the relevance of a result may be restricted to a time interval associated with the external event. For example, displaying the cancellation policy of an airline as the first result when a customer is searching for a reservation policy could send a negative impression, leaving customers wondering whether flights are often canceled or delayed. Therefore, any temporary relevance boosting for a result may need to be coordinated with the effect of the associated event.

Temporary relevance boosting of results described in relation to the embodiments herein offers a better solution than simply exposing the details of the event in response to the search. Often, events leading to the temporary relevance boosting (such as mechanical plane problems) may best be kept confidential from the customers. For example, an online retailer may not want to expose the details of its internal inventory management system on the dashboard of a self-service application. Instead, the online retailer may prefer to instead temporarily promote a result that explains the process for canceling an order or dealing with shipping delays.

FIG. 1 illustrates a block diagram 100 of a knowledge management system 102 and an event boost system 104, according to one embodiment. Most customer service applications will use some sort of knowledge management system 102. A knowledge management system 102 generally includes an intent engine 110 and a knowledge database 112. The intent engine 110 can receive user queries and derive an intent from the user queries. For example, a user query such as "I'm having trouble with my e-mail" may be analyzed by the intent engine 110 to assignee a general intent category of "e-mail troubleshooting." Intent engines are well-known in the art, and would be clearly understood by one having skill in the art.

After deriving an intent by the intent engine 110, a knowledge database 112 can be searched for results that are related to the identified intent category. For example, the knowledge database 112 may include a number of webpage links that are tagged with the "e-mail troubleshooting" category. The knowledge database 112 can return the set of results based on their relevance to the intent category. For example, the knowledge database 112 can return a subset of all results tagged with the "e-mail troubleshooting" intent category that are most often found to be relevant to users with e-mail problems.

As used herein, a knowledge database may be any database system that stores data for customer service applications. A knowledge database may store webpages, PDFs, videos, white papers, presentations, audio recordings, previously asked questions, links to solutions, references to third-party solutions, web links to external websites, pictures, illustrations, and/or the like. Any piece of information stored by a knowledge database may be referred to herein as a record. For example, a webpage or link to a webpage returned in response to a customer service query may be referred to as a record.

Relevancy of records within the knowledge database is generally determined by usage over time. If the records are added to the knowledge database, it may take a certain amount of time to "warm up" the record such that is promoted up the relevancy ladder to begin appearing as a relevant result. Conversely, if records generally fall out of favor with users, it may also take a certain amount of time to "cool off" the record such that it is gradually removed from the most relevant results. This acts as a time-based low pass filter for results such that transient selections do not generally have an effect until they become more permanent.

As described above, the problem with selecting records based on relevance is that temporary events may make certain records more relevant for a short time interval. Generally, the event will be over before the relevant records are allowed to warm up in the knowledge management system 102 to be presented as relevant to customer service inquiries. Therefore, embodiments described herein may couple an event boost system 104 to the knowledge management system 102. For illustrative purposes only, the knowledge management system 102 may include a score database 114. The score database 114 may be separate from, or integrated with, the knowledge database 112. The score database 114 is configured to store a relevancy metric, such as a numerical score, for records stored in the knowledge database 112. The knowledge database 112 can identify results that match the intent from the knowledge database, and extract metrics from the score database 114 in order to determine which results are most relevant to the identified intents. Note that in other embodiments, any type of relevancy metric may be used, and these metrics may be calculated on-the-fly, stored in the knowledge database 112, or stored separately in the score database 114.

In some embodiments, the event boost system 104 can be separate from the knowledge management system 102. This allows independent software vendors to develop a knowledge management system 102 according to the particular needs of the implementing business. The event boost system 104 can communicate with the score database 114 through an API or other standardized interface in order to temporarily boost scores based on external events. As used herein, the term "external" refers to events that affect systems outside of the knowledge management system 102 and may often refer to real-world events such as traffic delays, weather delays, system failures, inventory shortages, and/or the like. The event boost system 104 is configured to communicate with any type of knowledge management system 102 and to handle any type of external event by translating sent/received information into standard formats.

The event boost system 104 can communicate with other internal systems 106 in order to receive event notifications. Internal systems 106 may include systems packaged with the event boost system in an Enterprise Software System. Other internal systems 106 may also refer to any system that provides a known interface with which the event boost system 104 is configured to communicate. Additionally, the event boost system 104 may also communicate with external systems 108. External systems 108 may include systems accessible through the Internet, Web services provided by other entities, and/or the like.

Figure 2:
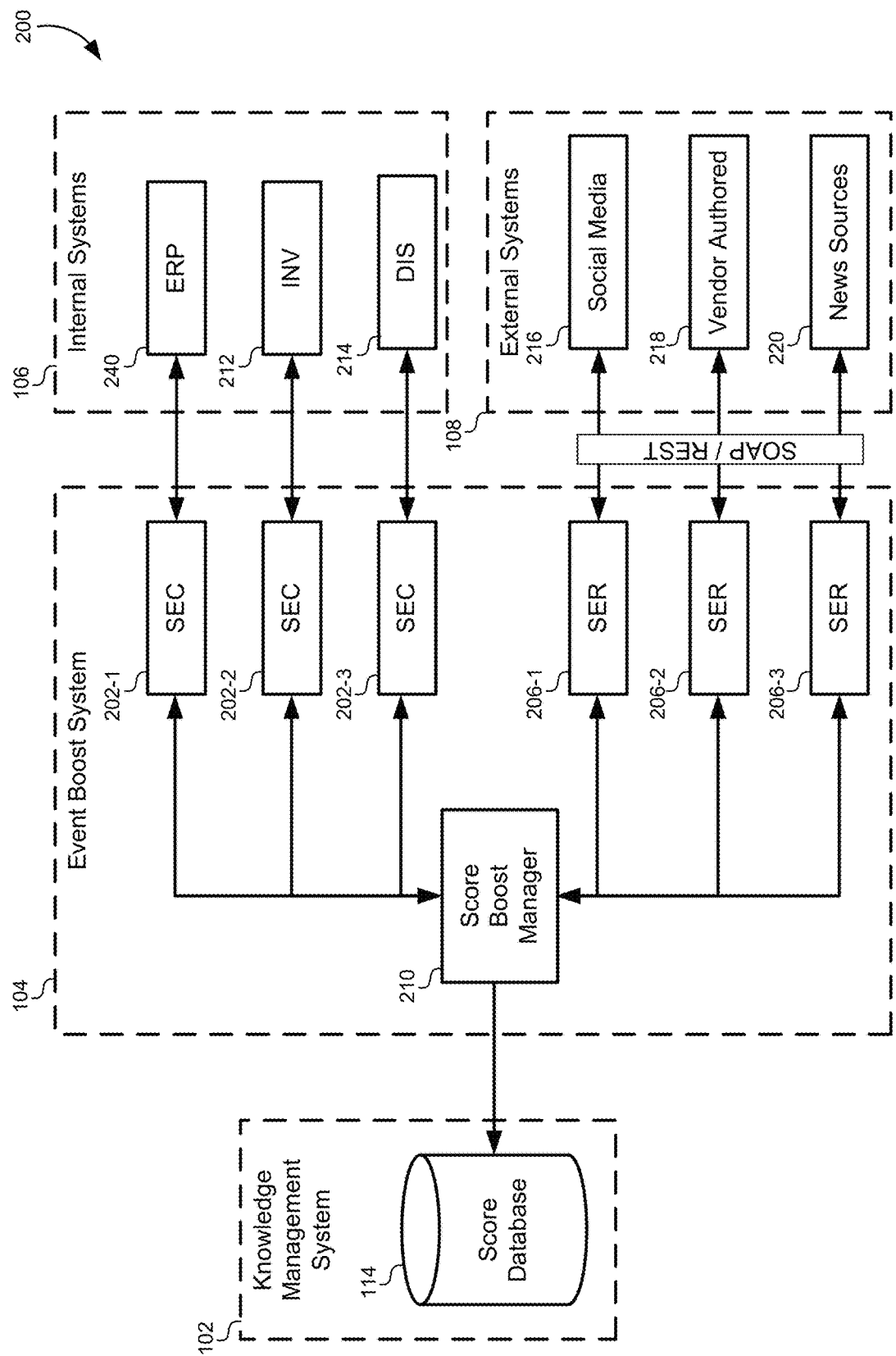
FIG. 2 illustrates a block diagram of an event boost system interfacing with internal and external systems, according to one embodiment.

FIG. 2 illustrates a block diagram 200 of an event boost system 104 interfacing with internal systems 106 and external systems 108, according to one embodiment. The event boost system may include one or more system event data collectors (SEC) 202 that are responsible for collecting data from internal systems 106. Often, these internal systems 106 may be hard to extend, but may provide external integration schemes such as standardized interfaces. Examples of internal systems 106 may include on-premise applications that expose web service APIs. Instances of system event data collectors 202 can communicate with the different internal systems 106 using proprietary APIs, as well as collecting and transforming data into a standard format. In the example of FIG. 2, the system event data collectors 202 can communicate with internal systems such as an enterprise resource planning system 204, an inventory management system 212, a distribution application 214, and/or the like. The system event data collectors 202 can collect event notifications from the internal systems 106 over time and provide the event notifications to a score boost manager 210. The event notifications can be stored within an event table of the score boost manager 210. The system event data collectors 202 can also receive information in formats that are specific to each of the internal systems 106 and convert this information to a standardized format for the score boost manager 210.

The event boost system 104 may also include one or more system event data receivers (SER) 206. Each of the system event data receivers 206 may be configured to receive data from systems that provide custom code execution and event notifications. Unlike the system event data collectors 202, some embodiments may include only a single instance of a system event data receiver 206-1. In other embodiments, system event data receivers 206 may be specially designed for each type of external system 108. When a single system event data collector 206-1 is used, each external system 216 may be required to publish an event notification using one or more supported protocols. For example, protocols may include REST, SOAP, HTTP/XML and/or the like. Exemplary external systems 108 may include social media 216, vendor authored systems 218, news publications 220, and/or the like.

The score boost manager 210 may be configured to receive event notifications from the system event data collectors 202 and/or the system event data receivers 206. An event notification may represent an event using a defined data structure. In some embodiments, an event notification may include an event start time, a predicted event stop time, a recheck interval, event descriptions, tags or indicators that identify records in the knowledge database that are identified as relevant to the event, a list of systems or entities that are affected by the event, an event severity level, a metric for boosting relevancy metrics for identified records in the knowledge database, and/or the like. Generally, the event notification data structure may be filled in as much as possible, and is configured to deal with a wide variety of event types, internal systems 106, external systems 108, and/or knowledge management systems 102.

The score boost manager 210 can receive event notifications and process event notifications in order to boost scores in the score database 114. The score database 114 may provide an interface that allows the score boost manager 210 to simply provide a new score for identified records, to decrement or increment scores for identified records, or to query identified records and/or store new scores in their place. The score boost manager 210 may also store the original scores in the score database 114 before they are changed by the score boost manager 210 such that they can be returned to normal after the event ends.

Figure 3A:
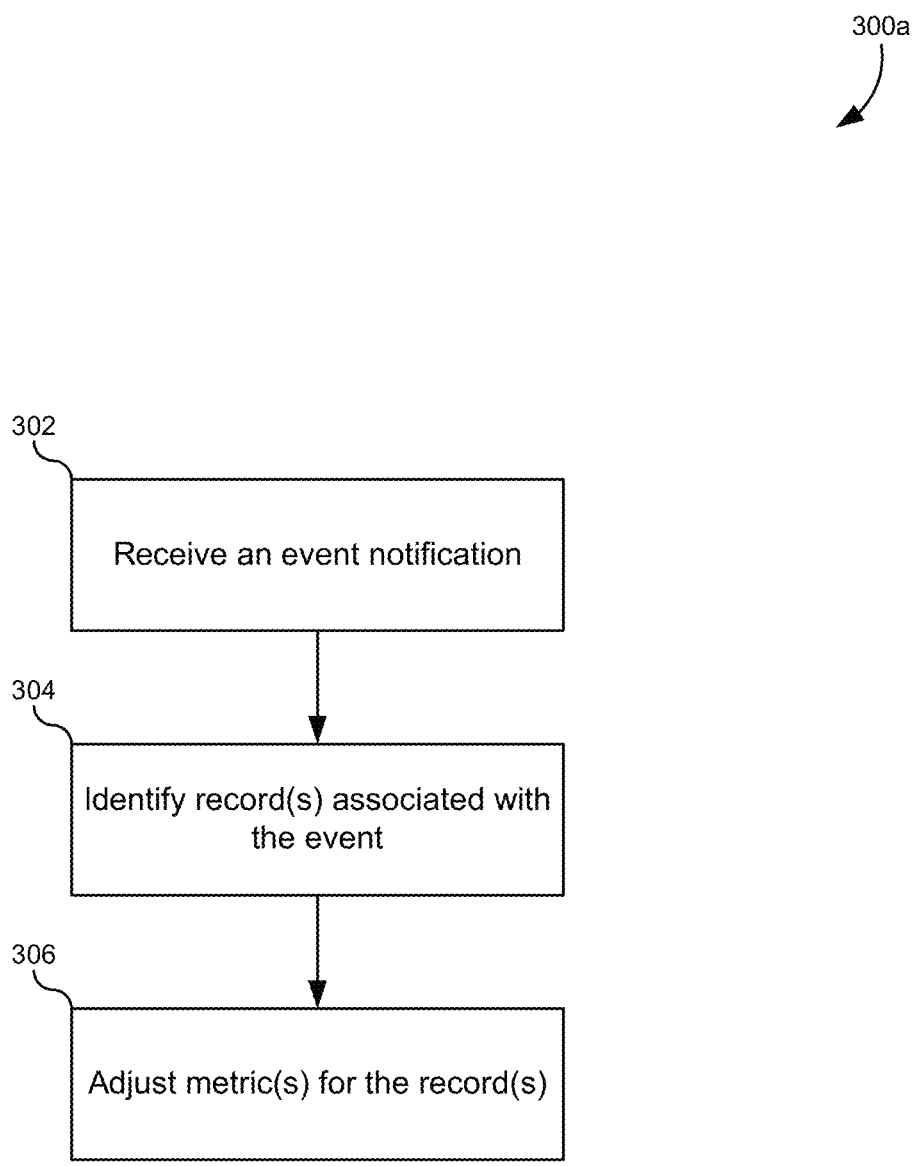
FIG. 3A illustrates a flowchart of a method for temporarily boosting knowledge base scores in response to external events, according to one embodiment.

FIG. 3A illustrates a flowchart 300a and of a method for temporarily boosting knowledge base scores in response to external events, according to one embodiment. This method may be carried out by a score boost system that can be implemented as an ad-on feature to an existing knowledge management system to interface with existing internal and external systems. The method may include receiving an event notification (302). The event notification may be received from any of the internal and/or external system types described herein. For example, the event may represent a failure of a software system that is different from the knowledge management system. In another example, the event may represent a delay in providing services, an inventory shortfall, a weather disturbance, labor problems, and/or the like. The event notification may be received in various formats and translated into a standardized format before processing. The event notification may be associated with an external event, such as a system failure, a real world event, and/or the like. As the system may be implemented as a software process operating on a general purpose computer system or as a special-purpose hardware system, the event notification may be received and processed by one or more processors in the event boost computer system.

In some embodiments, the event notification can be associated with a time interval that is associated with the triggering event. In some embodiments, the time interval may be identified by a start time and stop time. In some embodiments, the event notification can be represented by a start time and an expected time for the event to maintain its relevance. Additionally, the event notification may be represented by a start time with a recheck interval, for which the event system should perform periodic determinations as to whether the event is still active. In some embodiments, the time interval associated with the event notification may simply begin based on when the event notification is received and continue indefinitely until a second event notification is received indicating that the event has ended. Therefore, the time interval associated with the event notification can be dynamically defined as the event progresses, and need not have start and stop times that are known when the event notification is initially received.

The method may additionally include identifying records associated with the event (304). Generally, the records may be identified based on relevance to the event. In some embodiments, an event notification may be associated with a specific event type. For example, an event notification triggered by a delayed flight may be assigned an event type of "flight delays." In order to identify records associated with the event, a knowledge database may be searched for records that are also tagged as being relevant to flight delays. In some embodiments, a score database may include score records corresponding to information records in the knowledge database. Therefore, the score database may also include tags related to the event types, such that only the score database needs to be accessed instead of the knowledge database. In some embodiments, an event table can store records associated with each datatype. The records in the event table can identify records in the knowledge database that are affected by each event type.

The method may further include adjusting metrics for the identified records (306). Each record identified as being relevant to the event may be associated with a metric that is used to determine if the record is responsive to queries received by the knowledge management system. In some embodiments, the metric may be referred to as a relevance score. The metrics for the identified records can be adjusted such that they become more relevant during the time interval associated with the event. During this time interval, the records with boosted scores will be more likely to be responsive to user queries. In the airline example above, records associated with flight cancellation policies may be temporarily boosted such that they are responsive to more user queries while an event is occurring that causes flights to be delayed, such as inclement weather or gate shortages at the airport.

In some embodiments, the following exemplary algorithm may be followed. Event type definitions may be loaded for each of the target systems (ERP, INV, DIS, etc.). Each of the systems communicating with the event the system may be authenticated to ensure that the event notifications are from a trusted source. The event boost system can either query each of the target systems (e.g. internal systems) or can simply receive event notifications from the target systems. As event notifications are collected, the event the system can store each event in a queue with a start time, current time, stop time, interval length, recheck interval, and/or the like. For external systems, the system event data receiver described in relation to FIG. 2 may also be used. Events may be raised through the system event data receiver and transmitted through a supported protocol. As with the internal systems, requests and events can be authenticated, and event notifications can be stored in an event queue for processing.

It should be noted that the metrics used to rank relevancy and the way that these metrics can be boosted will be specific to each type of knowledge management system. In some cases, a simple score may be incremented or decremented. In other embodiments, more complicated metrics may be used that include statistical analyses, complex identifiers, and/or usage histories. In light of this disclosure, one having skill in the art would be able to readily analyze the type of scoring system used by the knowledge management system and implement a score boost system that was compatible therewith. For example, a knowledge database may include a first record and a second record that are both responsive to a particular type of customer service query. Normally, outside of the time interval associated with the event, the second record would be scored such that the knowledge management system would determine that the second record is more responsive to the customer service query. However, during an associated event, the event boost system would adjust the metric for the first record such that during the time interval associated with the event the first record would be determined to be more responsive to the customer service query.

In one exemplary algorithm, events can be loaded by the event boost manager that include start time between the current time and some buffer time (referred to as a lenience time). For each event in the event table, an event type may be accessed, records in the knowledge database that are related to the event type may be accessed, and scores associated with the access records may be adjusted or boosted accordingly. As each event record is processed, they can be removed or have a flag set indicating that they have been processed.

Figure 3B:
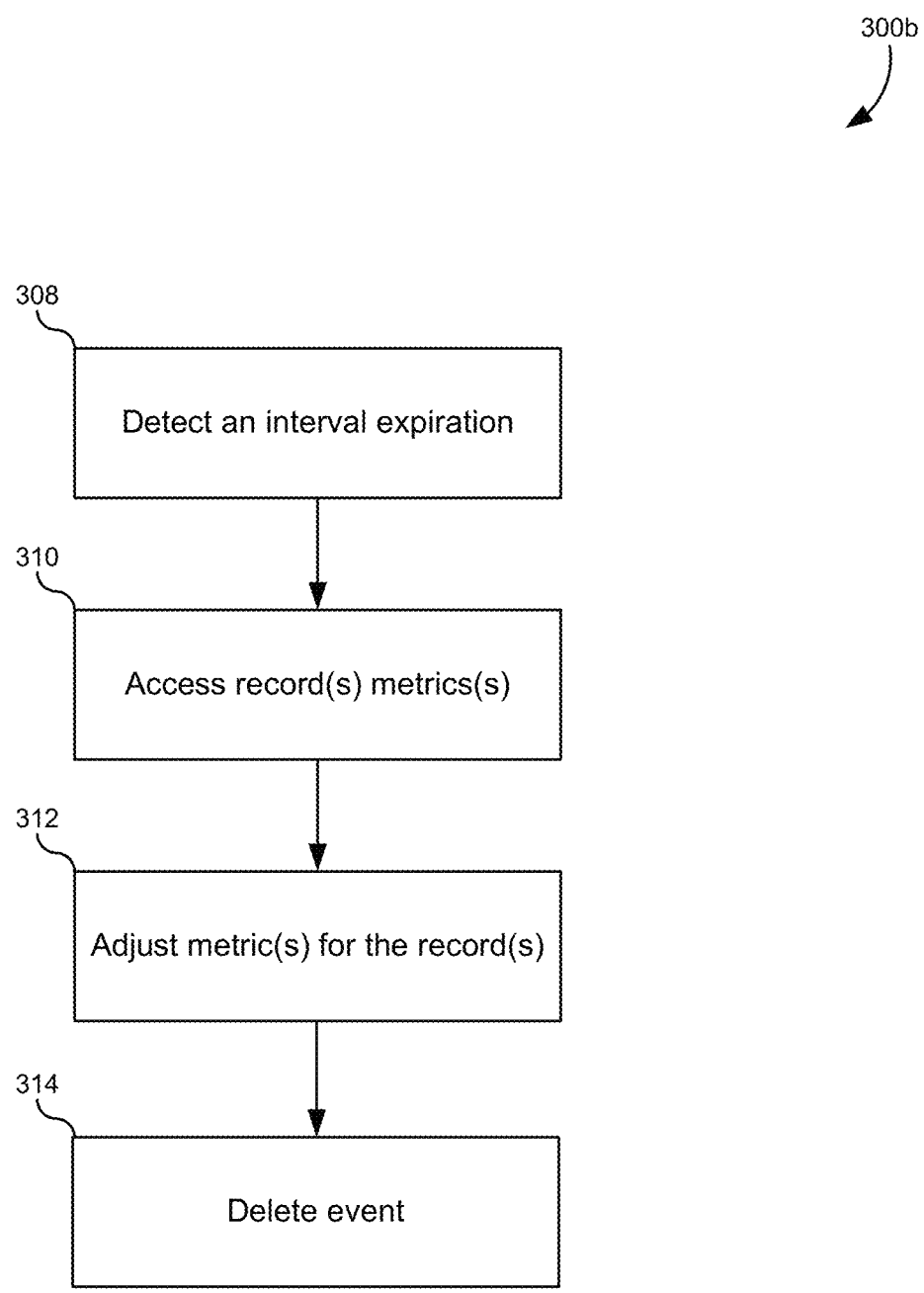
FIG. 3B illustrates a flowchart of a method for removing a temporary score boost, according to one embodiment.

FIG. 3B illustrates a flowchart 300b of a method for removing a temporary score boost, according to one embodiment. This method may be carried out after scores have been boosted in response to an event notification. The method may include detecting a time interval expiration (308). Expiration of the time interval associated with the event may be detected by detecting a stop time, determining that an assigned or default interval time has expired, receiving an event notification indicating that the event is ended, and/or the like. Note that in some embodiments, an event may become permanent. In this case, the time interval may expire without requiring the event boost system to take any action such that the boosted score in the knowledge management system retains its new value. For example, an event notification indicates that an inventory shortage for a particular item has occurred, and later an event notification indicates that the particular item has been discontinued by a supplier, the boosted score may become a permanent part of the system. This would make records regarding item substitutions or order cancellations more responsive to user queries about a particular item. Over time, queries regarding the item would gradually decrease, and the boosted score would gradually be reduced as would any other score in the knowledge/score database.

The method may also include accessing record metrics (310) and adjusting metrics for the records (312). When events are stored in an event table in the score boost manager, the score boost manager can load each event as an event end time occurs, as a recheck interval expires, and/or as an event interval expires. For each expiring event, the event type can be determined, records in the knowledge database associated with the event type can be accessed, and scores for these articles can be adjusted such that the event boost effect is removed. For example, if the score was increased by a factor of two when the event began, the score could be reduced by a factor of two when the event ends. In other embodiments, an original score may be saved and restored when the event expires. The method may also include deleting the event (314). For example, the event may be deleted from an event table in the event boost manager.

It should be appreciated that the specific steps illustrated in FIGS. 3A-3B provide particular methods of temporarily boosting scores according to various embodiments of the present invention. Other sequences of steps may also be performed according to alternative embodiments. For example, alternative embodiments of the present invention may perform the steps outlined above in a different order. Moreover, the individual steps illustrated in FIGS. 3A-3B may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 4 illustrates a plurality of tables 400 that may be used by an event boost manager, according to one embodiment. The plurality of tables 400 of FIG. 4 are merely exemplary, are meant to provide an example of how an event boost system may be implemented. Table 402 may include various records stored in a knowledge database. Each record may be associated with the unique ID, a score, and other metadata information, such as a time that the article was last updated. Each record in the knowledge database may also include a set of relevant terms that can be used by an intent engine to identify a particular record as being responsive to a customer service query. Each of the relevant terms may be associated with one intent category. Note that in this embodiment, the score database 114 and the knowledge database 112 of FIG. 1 are logically combined.

Table 404 illustrates an event type table. The event type table is used to map event types to specific records or record types in the knowledge database. For example, table 404 includes records that map an event type to a particular record along with an associated boost score with which the existing relevancy score of the knowledge record can be adjusted. For example, if an event of type E1 is received, then record 1 will be boosted by 40 points to a score of 50, and record 2 will be boosted 10 points to a score of 30.

Table 406 illustrates an event type table that includes event type definitions for various internal and/or external systems that provide event notifications to the event boost system. For example, the event type E1 indicates an event received from an ERP system when billing has not been initiated and an order is due within 10 days. Event type E2 indicates an event record received from an INV system when the shipment is due within the next five days and inventory levels are less than a predetermined amount, such as 10 units. In this embodiment, event E1 and E2 include a recheck interval indicating that the status of this event should be rechecked every 10 hours until it is resolved. As described above, other embodiments may include a start time, a stop time, an event interval, or an indication that the event length will be indefinite.

Table 408 illustrates an event table for events that have been received by the event boost system. Events may be stored in table 408 as they are received and processed sequentially. Each record in table 408 may include a unique event ID, and event type, a start time, and/or an end time. The start time may be set as the current time when each event is processed. The end time may be calculated by a recheck interval, by static stop time in the event notification, or by a system default. Table 408 may also include a flag indicating whether or not the event has been processed. Unprocessed events may indicate score boost that still need to be processed. While processed events indicate situations where scores have already been boosted but where the event is not yet expired.

Figure 5:
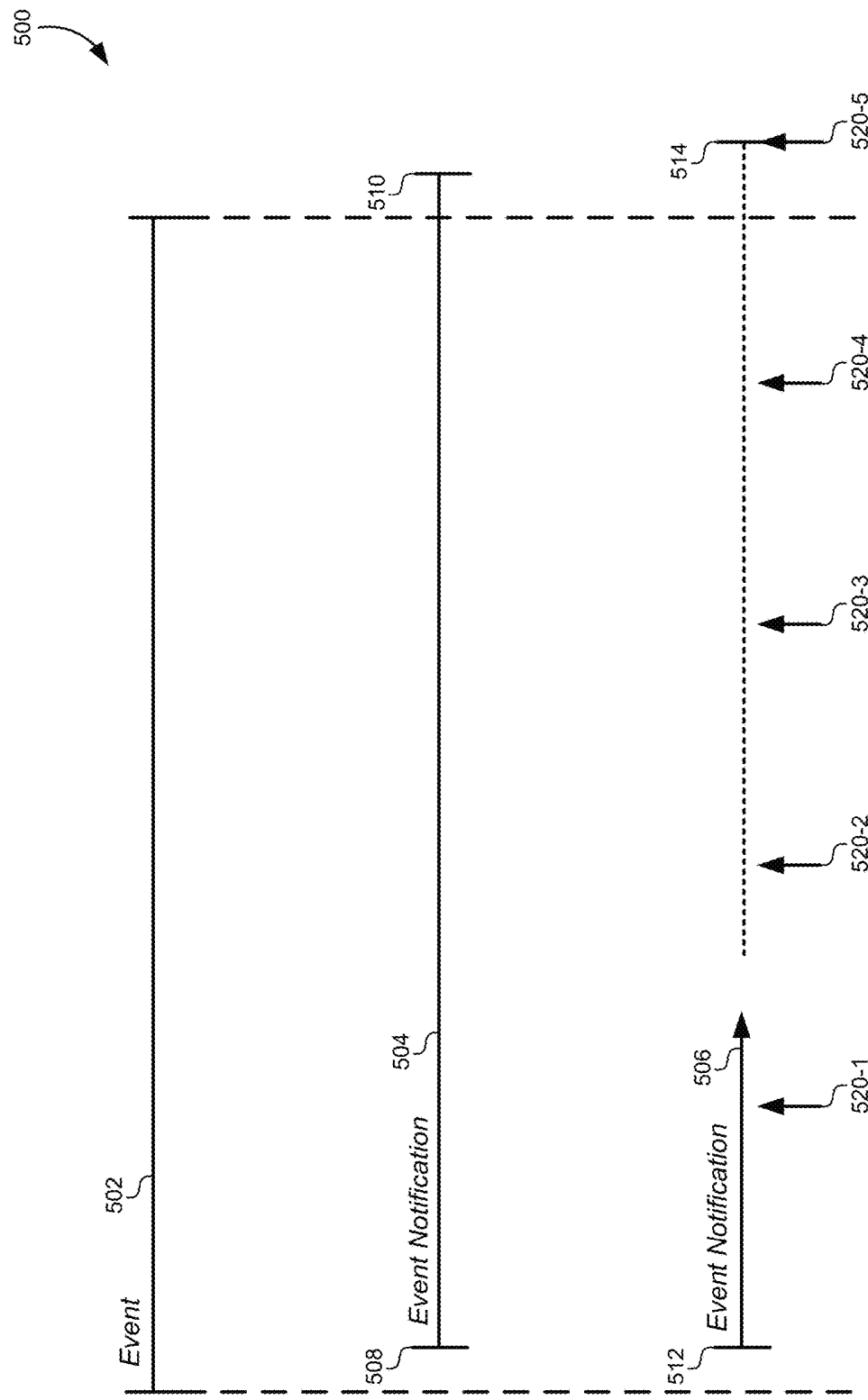
FIG. 5 illustrates a diagram of event notification timelines, according to one embodiment.

FIG. 5 illustrates a diagram 500 of event notification timelines, according to one embodiment. This diagram illustrates how the timing of an actual event, the time interval associated with the event, and a time during which the scores boosted may be related. Time interval 502 illustrates a time interval of actual event. For example, time interval 502 may represent an interval during which a Web payment system has failed. At some point near the beginning of the actual event interval, an event notification 508 may be sent to the event boost system. The event notification may include a time interval 504 that is associated with the event. Note that time interval 502 and time interval 504 need not be exactly the same. Time interval 504 can be defined using a predefined stop time or interval lengths, or may be signified by a new event notification 510 indicating that the event time interval 502 has ended.

In another case, an event notification 512 may be sent to initiate a time interval 506 associated with the event. Instead of defining the length of the time interval 506, the event notification 512 may include a recheck interval, or may simply not define the length or expiration of the time interval 506. The event boost system can periodically determine whether the event is ended by querying the system that provided the event notification 512. Each of these determinations 520 may be made at regular intervals determined by the event notification 512, or by the event boost system itself. Eventually, one of the determinations 520-5 may determine that the event has ended, and the time interval 506 may expire.

Each of the methods described herein may be implemented by a computer system, such as computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 6:
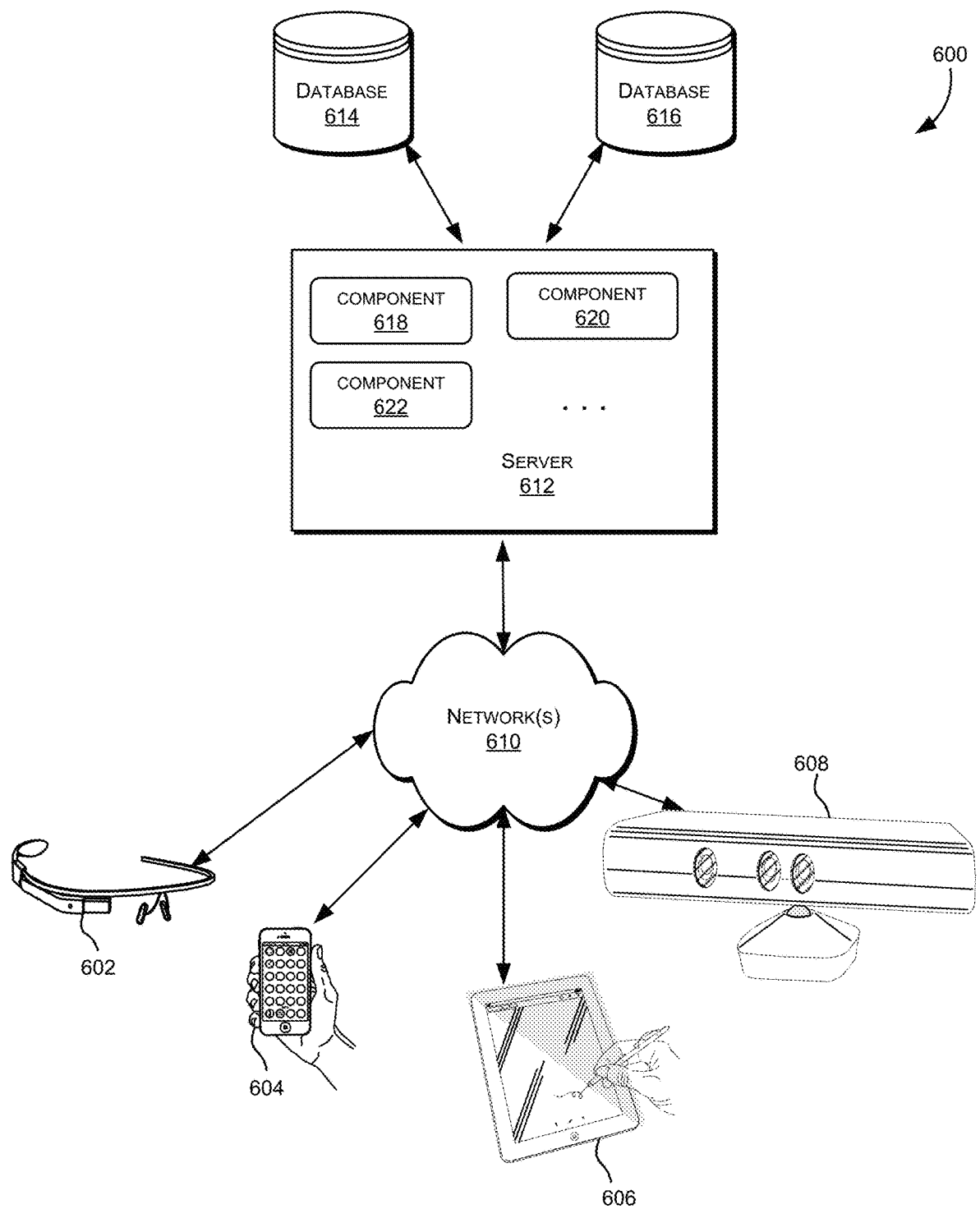
FIG. 6 illustrates a simplified block diagram of a distributed system for implementing some of the embodiments.

FIG. 6 depicts a simplified diagram of a distributed system 600 for implementing one of the embodiments. In the illustrated embodiment, distributed system 600 includes one or more client computing devices 602, 604, 606, and 608, which are configured to execute and operate a client application such as a web browser, proprietary client (e.g., Oracle Forms), or the like over one or more network(s) 610. Server 612 may be communicatively coupled with remote client computing devices 602, 604, 606, and 608 via network 610.

In various embodiments, server 612 may be adapted to run one or more services or software applications provided by one or more of the components of the system. In some embodiments, these services may be offered as web-based or cloud services or under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in the figure, the software components 618, 620 and 622 of system 600 are shown as being implemented on server 612. In other embodiments, one or more of the components of system 600 and/or the services provided by these components may also be implemented by one or more of the client computing devices 602, 604, 606, and/or 608. Users operating the client computing devices may then utilize one or more client applications to use the services provided by these components. These components may be implemented in hardware, firmware, software, or combinations thereof. It should be appreciated that various different system configurations are possible, which may be different from distributed system 600. The embodiment shown in the figure is thus one example of a distributed system for implementing an embodiment system and is not intended to be limiting.

Client computing devices 602, 604, 606, and/or 608 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 602, 604, 606, and 608 may be any other electronic device, such as a thin-client computer, an Internet-enabled gaming system (e.g., a Microsoft Xbox gaming console with or without a Kinect® gesture input device), and/or a personal messaging device, capable of communicating over network(s) 610.

Although exemplary distributed system 600 is shown with four client computing devices, any number of client computing devices may be supported. Other devices, such as devices with sensors, etc., may interact with server 612.

Network(s) 610 in distributed system 600 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 610 can be a local area network (LAN), such as one based on Ethernet, Token-Ring and/or the like. Network(s) 610 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE)

802.11 suite of protocols, Bluetooth®, and/or any other wireless protocol); and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 612 may be adapted to run one or more services or software applications described in the foregoing disclosure. For example, server 612 may correspond to a server for performing processing described above according to an embodiment of the present disclosure.

Server 612 may run an operating system including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more databases 614 and 616. Databases 614 and 616 may reside in a variety of locations. By way of example, one or more of databases 614 and 616 may reside on a non-transitory storage medium local to (and/or resident in) server 612. Alternatively, databases 614 and 616 may be remote from server 612 and in communication with server 612 via a network-based or dedicated connection. In one set of embodiments, databases 614 and 616 may reside in a storage-area network (SAN). Similarly, any necessary files for performing the functions attributed to server 612 may be stored locally on server 612 and/or remotely, as appropriate. In one set of embodiments, databases 614 and 616 may include relational databases, such as databases provided by Oracle, that are adapted to store, update, and retrieve data in response to SQL-formatted commands.

Figure 7:
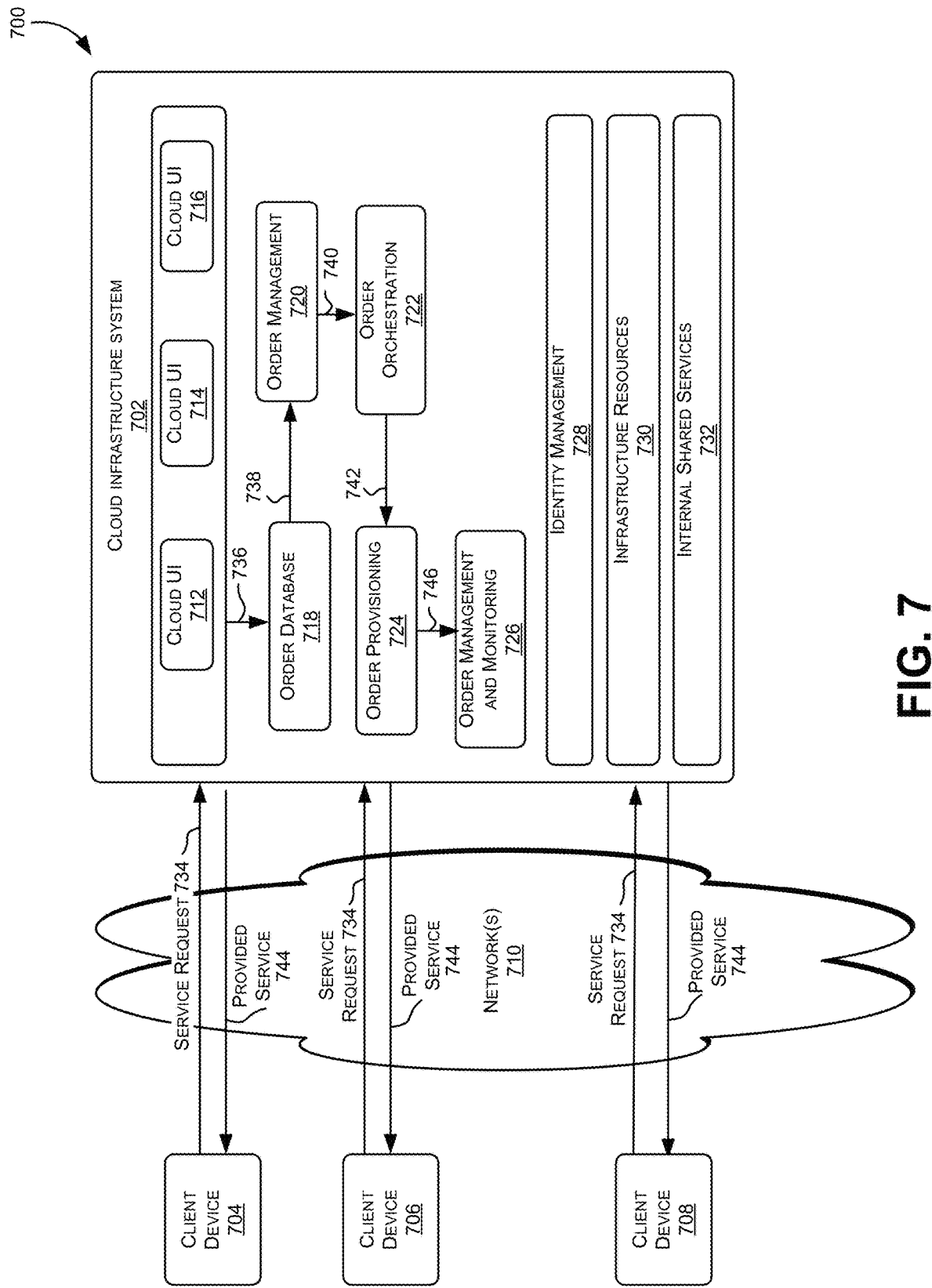
FIG. 7 illustrates a simplified block diagram of components of a system environment by which services provided by the components of an embodiment system may be offered as cloud services.

FIG. 7 is a simplified block diagram of one or more components of a system environment 700 by which services provided by one or more components of an embodiment system may be offered as cloud services, in accordance with an embodiment of the present disclosure. In the illustrated embodiment, system environment 700 includes one or more client computing devices 704, 706, and 708 that may be used by users to interact with a cloud infrastructure system 702 that provides cloud services. The client computing devices may be configured to operate a client application such as a web browser, a proprietary client application (e.g., Oracle Forms), or some other application, which may be used by a user of the client computing device to interact with cloud infrastructure system 702 to use services provided by cloud infrastructure system 702.

It should be appreciated that cloud infrastructure system 702 depicted in the figure may have other components than those depicted. Further, the embodiment shown in the figure is only one example of a cloud infrastructure system that may incorporate an embodiment of the invention. In some other embodiments, cloud infrastructure system 702 may have more or fewer components than shown in the figure, may combine two or more components, or may have a different configuration or arrangement of components.

Client computing devices 704, 706, and 708 may be devices similar to those described above for 602, 604, 606, and 608.

Although exemplary system environment 700 is shown with three client computing devices, any number of client computing devices may be supported. Other devices such as devices with sensors, etc. may interact with cloud infrastructure system 702.

Network(s) 710 may facilitate communications and exchange of data between clients 704, 706, and 708 and cloud infrastructure system 702. Each network may be any type of network familiar to those skilled in the art that can support data communications using any of a variety of commercially-available protocols, including those described above for network(s) 610.

Cloud infrastructure system 702 may comprise one or more computers and/or servers that may include those described above for server 612.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 702 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 702 may be adapted to automatically provision, manage and track a customer's subscription to services offered by cloud infrastructure system 702. Cloud infrastructure system 702 may provide the cloud services via different deployment models. For example, services may be provided under a public cloud model in which cloud infrastructure system 702 is owned by an organization selling cloud services (e.g., owned by Oracle) and the services are made available to the general public or different industry enterprises. As another example, services may be provided under a private cloud model in which cloud infrastructure system 702 is operated solely for a single organization and may provide services for one or more entities within the organization. The cloud services may also be provided under a community cloud model in which cloud infrastructure system 702 and the services provided by cloud infrastructure system 702 are shared by several organizations in a related community. The cloud services may also be provided under a hybrid cloud model, which is a combination of two or more different models.

In some embodiments, the services provided by cloud infrastructure system 702 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 702. Cloud infrastructure system 702 then performs processing to provide the services in the customer's subscription order.

In some embodiments, the services provided by cloud infrastructure system 702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 702 may also include infrastructure resources 730 for providing the resources used to provide various services to customers of the cloud infrastructure system. In one embodiment, infrastructure resources 730 may include pre-integrated and optimized combinations of hardware, such as servers, storage, and networking resources to execute the services provided by the PaaS platform and the SaaS platform.

In some embodiments, resources in cloud infrastructure system 702 may be shared by multiple users and dynamically re-allocated per demand. Additionally, resources may be allocated to users in different time zones. For example, cloud infrastructure system 730 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 732 may be provided that are shared by different components or modules of cloud infrastructure system 702 and by the services provided by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 702 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 702, and the like.

In one embodiment, as depicted in the figure, cloud management functionality may be provided by one or more modules, such as an order management module 720, an order orchestration module 722, an order provisioning module 724, an order management and monitoring module 726, and an identity management module 728. These modules may include or be provided using one or more computers and/or servers, which may be general purpose computers, specialized server computers, server farms, server clusters, or any other appropriate arrangement and/or combination.

In exemplary operation 734, a customer using a client device, such as client device 704, 706 or 708, may interact with cloud infrastructure system 702 by requesting one or more services provided by cloud infrastructure system 702 and placing an order for a subscription for one or more services offered by cloud infrastructure system 702. In certain embodiments, the customer may access a cloud User Interface (UI), cloud UI 712, cloud UI 714 and/or cloud UI 716 and place a subscription order via these UIs. The order information received by cloud infrastructure system 702 in response to the customer placing an order may include information identifying the customer and one or more services offered by the cloud infrastructure system 702 that the customer intends to subscribe to.

After an order has been placed by the customer, the order information is received via the cloud UIs, 712, 714 and/or 716.

At operation 736, the order is stored in order database 718. Order database 718 can be one of several databases operated by cloud infrastructure system 718 and operated in conjunction with other system elements.

At operation 738, the order information is forwarded to an order management module 720. In some instances, order management module 720 may be configured to perform billing and accounting functions related to the order, such as verifying the order, and upon verification, booking the order.

At operation 740, information regarding the order is communicated to an order orchestration module 722. Order orchestration module 722 may utilize the order information to orchestrate the provisioning of services and resources for the order placed by the customer. In some instances, order orchestration module 722 may orchestrate the provisioning of resources to support the subscribed services using the services of order provisioning module 724.

In certain embodiments, order orchestration module 722 enables the management of business processes associated with each order and applies business logic to determine whether an order should proceed to provisioning. At operation 742, upon receiving an order for a new subscription, order orchestration module 722 sends a request to order provisioning module 724 to allocate resources and configure those resources needed to fulfill the subscription order. Order provisioning module 724 enables the allocation of resources for the services ordered by the customer. Order provisioning module 724 provides a level of abstraction between the cloud services provided by cloud infrastructure system 700 and the physical implementation layer that is used to provision the resources for providing the requested services. Order orchestration module 722 may thus be isolated from implementation details, such as whether or not services and resources are actually provisioned on the fly or pre-provisioned and only allocated/assigned upon request.

At operation 744, once the services and resources are provisioned, a notification of the provided service may be sent to customers on client devices 704, 706 and/or 708 by order provisioning module 724 of cloud infrastructure system 702.

At operation 746, the customer's subscription order may be managed and tracked by an order management and monitoring module 726. In some instances, order management and monitoring module 726 may be configured to collect usage statistics for the services in the subscription order, such as the amount of storage used, the amount data transferred, the number of users, and the amount of system up time and system down time.

In certain embodiments, cloud infrastructure system 700 may include an identity management module 728. Identity management module 728 may be configured to provide identity services, such as access management and authorization services in cloud infrastructure system 700. In some embodiments, identity management module 728 may control information about customers who wish to utilize the services provided by cloud infrastructure system 702. Such information can include information that authenticates the identities of such customers and information that describes which actions those customers are authorized to perform relative to various system resources (e.g., files, directories, applications, communication ports, memory segments, etc.) Identity management module 728 may also include the management of descriptive information about each customer and about how and by whom that descriptive information can be accessed and modified.

Figure 8:
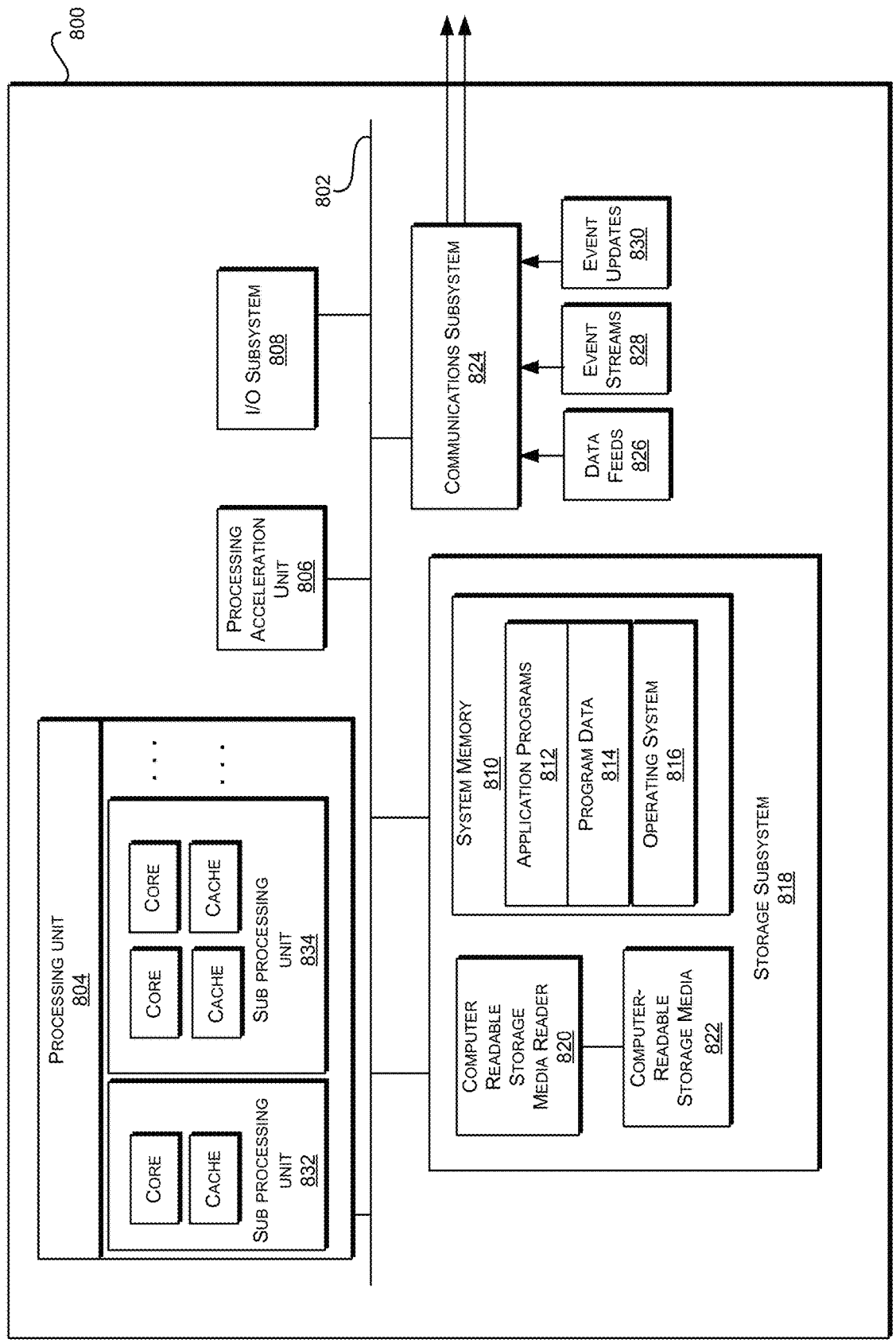
FIG. 8 illustrates an exemplary computer system, in which various embodiments may be implemented.

FIG. 8 illustrates an exemplary computer system 800, in which various embodiments of the present invention may be implemented. The system 800 may be used to implement any of the computer systems described above. As shown in the figure, computer system 800 includes a processing unit 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 includes tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 804, which can be implemented as one or more integrated circuits (e.g., a conventional microprocessor or microcontroller), controls the operation of computer system 800. One or more processors may be included in processing unit 804. These processors may include single core or multicore processors. In certain embodiments, processing unit 804 may be implemented as one or more independent processing units 832 and/or 834 with single or multicore processors included in each processing unit. In other embodiments, processing unit 804 may also be implemented as a quad-core processing unit formed by integrating two dual-core processors into a single chip.

In various embodiments, processing unit 804 can execute a variety of programs in response to program code and can maintain multiple concurrently executing programs or processes. At any given time, some or all of the program code to be executed can be resident in processor(s) 804 and/or in storage subsystem 818. Through suitable programming, processor(s) 804 can provide various functionalities described above. Computer system 800 may additionally include a processing acceleration unit 806, which can include a digital signal processor (DSP), a special-purpose processor, and/or the like.

I/O subsystem 808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Ski® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 800 may comprise a storage subsystem 818 that comprises software elements, shown as being currently located within a system memory 810. System memory 810 may store program instructions that are loadable and executable on processing unit 804, as well as data generated during the execution of these programs.

Depending on the configuration and type of computer system 800, system memory 810 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 804. In some implementations, system memory 810 may include multiple different types of memory, such as static random access memory (SRAM) or dynamic random access memory (DRAM). In some implementations, a basic input/output system (BIOS), containing the basic routines that help to transfer information between elements within computer system 800, such as during start-up, may typically be stored in the ROM. By way of example, and not limitation, system memory 810 also illustrates application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 818 may also provide a tangible computer-readable storage medium for storing the basic programming and data constructs that provide the functionality of some embodiments. Software (programs, code modules, instructions) that when executed by a processor provide the functionality described above may be stored in storage subsystem 818. These software modules or instructions may be executed by processing unit 804. Storage subsystem 818 may also provide a repository for storing data used in accordance with the present invention.

Storage subsystem 800 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for temporarily and/or more permanently containing, storing, transmitting, and retrieving computer-readable information.

Computer-readable storage media 822 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 800.

By way of example, computer-readable storage media 822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to connect to one or more devices via the Internet. In some embodiments communications subsystem 824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

In some embodiments, communications subsystem 824 may also receive input communication in the form of structured and/or unstructured data feeds 826, event streams 828, event updates 830, and the like on behalf of one or more users who may use computer system 800.

By way of example, communications subsystem 824 may be configured to receive data feeds 826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 824 may also be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of temporarily boosting knowledge record metrics in a knowledge management system during external event intervals, the method comprising:
　receiving, using a processor, an event notification, wherein:
　　the event notification is associated with a time interval; and
　　the event notification is associated with an event;
　identifying, using the processor, a record in a knowledge database, wherein:
　　the record is identified based on relevance to the event;
　　the record is associated with a metric; and
　　the metric is used to determine if the record is responsive to queries received by the knowledge management system; and
　adjusting, using the processor, the metric during the time interval such that the record is more likely to be responsive to user queries.

2. The method of claim 1, further comprising:
　receiving, using the processor, a query for the knowledge management system, wherein the record comprises a first record;
　determining, using the processor, that the first record and a second record are both responsive to the query; and providing, based at least in part on the metric, the first record ranked higher than the second record if the query is received during the time interval, or providing the second record ranked higher than the first record if the query is received outside of the time interval.

3. The method of claim 1, further comprising:
determining, using the processor, that the time interval has expired; and
removing, using the processor, the adjustment to the metric of the record such that the record is less likely to be responsive to the user queries.

4. The method of claim 1, wherein the event comprises a failure of a software system that is different from the knowledge management system.

5. The method of claim 1, wherein the event comprises a real-world event.

6. The method of claim 1, further comprising:
determining, using the processor, a start time for the time interval; and
periodically determining, after adjusting the metric, whether an event stop time has been received or determined.

7. The method of claim 1, wherein:
the event notification comprises an event type; and
the step of identifying the record in the knowledge database comprises retrieving a set of records from an event table using the event type, wherein the event table stores a record and a score increment for each event type.

8. The method of claim 7, further comprising:
retrieving a score from the event table for the record, wherein:
the metric comprises a numeric score; and
adjusting the metric during the time interval comprises increasing the numeric score using the score increment.

9. A non-transitory computer-readable medium comprising a sequence of instructions which, when executed by one or more processors, causes the one or more processors to temporarily boost knowledge record metrics in a knowledge management system during external event intervals by:
receiving an event notification, wherein:
the event notification is associated with a time interval; and
the event notification is associated with an event;
identifying a record in a knowledge database, wherein:
the record is identified based on relevance to the event;
the record is associated with a metric; and
the metric is used to determine if the record is responsive to queries received by the knowledge management system; and
adjusting the metric during the time interval such that the record, identified as relevant to the event, is more likely to be responsive to user queries directed to a different topic than the event, and removing the adjustment from the metric of the record when the time interval expires.

10. The non-transitory computer-readable medium according to claim 9 wherein the instructions further cause the one or more processors to temporarily boost knowledge record metrics in a knowledge management system during external event intervals by:
receiving a query for the knowledge management system, wherein the record comprises a first record;
determining that the first record and a second record are both responsive to the query; and
providing, based at least in part on the metric, the first record ranked higher than the second record if the query is received during the time interval, or providing the second record ranked higher than the first record if the query is received outside of the time interval.

11. The non-transitory computer-readable medium according to claim 9 wherein the instructions further cause the one or more processors to temporarily boost knowledge record metrics in a knowledge management system during external event intervals by:
determining that the time interval has expired; and
adjusting the metric such that the record is less likely to be responsive to user queries.

12. The non-transitory computer-readable medium according to claim 9 wherein the instructions further cause the one or more processors to temporarily boost knowledge record metrics in a knowledge management system during external event intervals by:
determining a start time for the time interval; and
periodically determining, after adjusting the metric, whether an event stop time has been received or determined.

13. The non-transitory computer-readable medium according to claim 9 wherein the instructions further cause the one or more processors to temporarily boost knowledge record metrics in a knowledge management system during external event intervals by:
retrieving a score from the event table for the record, wherein:
the metric comprises a numeric score; and
adjusting the metric during the time interval comprises increasing the numeric score using the score increment.

14. The computer-readable memory according to claim 9 wherein the event comprises a failure of a software system that is different from the knowledge management system.

15. The computer-readable memory according to claim 9 wherein the event comprises a real-world event.

16. The computer-readable memory according to claim 9 wherein:
the event notification comprises an event type; and
the step of identifying the record in the knowledge database comprises retrieving a set of records from an event table using the event type, wherein the event table stores a record and a score increment for each event type.

17. A system comprising:
one or more processors; and
a memory communicatively coupled with and readable by the one or more processors and comprising a sequence of instructions which, when executed by the one or more processors, cause the one or more processors to temporarily boost knowledge record metrics in a knowledge management system during external event intervals by:
receiving an event notification, wherein:
the event notification is associated with a time interval; and
the event notification is associated with an event;
identifying a record in a knowledge database, wherein:
the record is identified based on relevance to the event;
the record is associated with a metric; and
the metric is used to determine if the record is responsive to queries received by the knowledge management system; and
adjusting the metric during the time interval such that the record relevant to the event is more likely to be responsive to user queries that are directed to a different topic than the event.

18. The system of claim 17 wherein the instructions further cause the one or more processors to temporarily boost knowledge record metrics in a knowledge management system during external event intervals by:
   receiving a query for the knowledge management system, wherein the record comprises a first record;
   determining that the first record and a second record are both responsive to the query; and
   providing, based at least in part on the metric, the first record ranked higher than the second record if the query is received during the time interval, or providing the second record ranked higher than the first record if the query is received outside of the time interval.

19. The system of claim 17 wherein the instructions further cause the one or more processors to temporarily boost knowledge record metrics in a knowledge management system during external event intervals by:
   determining that the time interval has expired; and
   removing the adjustment to the metric such that the record is less likely to be responsive to the user queries.

20. The system of claim 17 wherein the instructions further cause the one or more processors to temporarily boost knowledge record metrics in a knowledge management system during external event intervals by:
   retrieving a score from the event table for the record, wherein:
      the metric comprises a numeric score; and
   adjusting the metric during the time interval comprises increasing the numeric score using the score increment.

* * * * *

UNITED STATES PATENT AND TRADEMARK OFFICE
CERTIFICATE OF CORRECTION

PATENT NO. : 10,614,468 B2
APPLICATION NO. : 14/163791
DATED : April 7, 2020
INVENTOR(S) : Vedula Page 1 of 1

It is certified that error appears in the above-identified patent and that said Letters Patent is hereby corrected as shown below:

In the Specification

In Column 2, Lines 5-7, delete "The instructions may cause the processor(s) to The instructions may cause the processor(s) to" and insert -- The instructions may cause the processor(s) to --, therefor.

In the Claims

In Column 24, Line 31, in Claim 14, delete "computer readable memory" and insert -- non-transitory computer-readable medium --, therefor.

In Column 24, Line 34, in Claim 15, delete "computer readable memory" and insert -- non-transitory computer-readable medium --, therefor.

In Column 24, Line 36, in Claim 16, delete "computer readable memory" and insert -- non-transitory computer-readable medium --, therefor.

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*